(12) United States Patent
Miyasaka et al.

(10) Patent No.: US 7,265,307 B2
(45) Date of Patent: Sep. 4, 2007

(54) ILLUMINATION PUSH SWITCH UNIT

(75) Inventors: Yasuhiro Miyasaka, Miyagi-ken (JP); Jungkil Nam, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 143 days.

(21) Appl. No.: 11/274,881

(22) Filed: Nov. 2, 2005

(65) Prior Publication Data

US 2006/0098429 A1    May 11, 2006

(30) Foreign Application Priority Data

Nov. 9, 2004    (JP) .............................. 2004-325461

(51) Int. Cl.
*H01H 9/00* (2006.01)
(52) U.S. Cl. .................. 200/314; 362/24; 362/26; 362/29; 362/30; 200/313
(58) Field of Classification Search .................. 362/23, 362/26, 27, 29, 30; 200/313, 314
See application file for complete search history.

(56) References Cited

U.S. PATENT DOCUMENTS

| | | | |
|---|---|---|---|
| 4,496,813 A | * | 1/1985 | Fukushima ................. 200/314 |
| 4,683,359 A | * | 7/1987 | Wojtanek ................... 200/314 |
| 5,651,450 A | * | 7/1997 | Priesemuth ................. 200/314 |
| 6,210,010 B1 | * | 4/2001 | Pontetti et al. .............. 362/24 |
| 6,997,572 B2 | * | 2/2006 | Ono et al. ................... 362/24 |

FOREIGN PATENT DOCUMENTS

JP    2003-208835    7/2003

* cited by examiner

*Primary Examiner*—Sandra O'Shea
*Assistant Examiner*—James W Cranson, Jr.
(74) *Attorney, Agent, or Firm*—Brinks Hofer Gilson & Lione

(57) ABSTRACT

An illumination push switch unit is provided in which driving units for driving first and second detecting units are formed at side walls other than adjacent side walls of peripheral walls of first and second sliders with a barrier walls of a case interposed therebetween, notch portions are provided at the bottom surface side of the barrier wall and the bottom surface sides of the adjacent side walls of the peripheral walls with the barrier wall interposed therebetween, and a space portion, which becomes an optical path toward the display surfaces of the first and second operation members, is formed between the top surface of the insulating substrate and the notch portions through the notch portions.

2 Claims, 7 Drawing Sheets

ILLUMINATION PUSH SWITCH UNIT

BACKGROUND OF THE INVENTION

1. Field of the Invention

The present invention relates to a structure of an illumination push switch unit which is illuminated from an inner side, as in an electric apparatus.

2. Description of the Related Art

In recent years, various electric apparatuses, such as a television or a navigation system, an audio apparatus like CDs or cassettes, and an air conditioner, have been mounted in a vehicle. Further, various display units, such as characters or figures, are provided on operation surfaces of switch operation knobs for operating switches so as to clearly discriminate the switch operation knobs. Furthermore, in order to improve operability at night, each display unit is constructed such that it is a transmissive type and is illuminated through illumination from an inner side.

There has been known a structure for the illumination of such a switch operation knob (for example, see JP-A-2003-208835). According to the structure, light transmitting holes for illumination are formed in a substrate where predetermined circuits are formed such that they correspond to installation positions of switch operation knobs, LEDs each serving as light sources are mounted on a rear surface of the substrate, and operations surfaces of the switch operation knobs mounted on the surface of the substrate are constructed so as to be illuminated from the inner sides through the light transmitting holes.

The structure of the illumination push switch unit according to the related art is shown in FIGS. 7 to 9. FIG. 7 is a cross-sectional view of essential elements of the illumination push switch unit according to the related art, FIG. 8 is a cross-sectional view taken along the line VIII-VIII of FIG. 7, and FIG. 9 is a diagram illustrating each switch operation knob.

In FIGS. 7 to 9, a reference numeral 51 indicates a substrate where predetermined circuits are formed, and the substrate is disposed at the inner side of an operation panel 52. On the substrate 51, switches 53 composed of duct switches are mounted corresponding to various electric apparatuses mounted in a vehicle, and switch operation knobs 54 operating the switches 53 are mounted.

Each switch operation knob 54 is disposed such that its operation surface 54a is more exposed than an opening formed in the operation panel 52, and each switch 53 is operated by pressing operation. At this time, if a pressing force is released, the switch 53 returns to an initial state by a returning force of the switch 53.

Each switch operation knob 54 is formed so as to have a predetermined shape using an acrylic resin or polycarbonate resin having a light transmitting property. As shown in FIG. 9, in portions of the respective operation surfaces 54a, various transmissive display units 54b composed of characters or figures according to a switch function are formed to perform display through a coating material having a light transmitting property. In addition, in the other portions of the respective operation surfaces 54a, a coating material having a light shielding property is used.

In the substrate 51, light transmitting holes 51a are formed to correspond to mounting positions of the respective switch operation knobs 54, and LEDs 55 each serving as a light source for illumination are mounted on a rear surface of the substrate 51 corresponding to the respective light transmitting hole 51a.

However, in the structure of the illumination push switch unit according to the related art, a barrier wall of the operation panel 52 disposed between the adjacent switch operation knobs 54, the adjacent side walls of the switch operation knobs 54, and the driving unit of the switch 53 are formed to a depth (length) which disrupts an optical path from a point of an extending line of the barrier wall toward light transmissive display units 54b of the adjacent switch operation knobs 54. For this reason, in the distribution illumination type in which a light-emitting unit is provided on the extending line of the barrier wall for illuminating the light transmissive display units 54b of the two adjacent switch operation knobs 54, it is required that each of the barrier wall of the operation panel (case) and the switch operation knob 54 is separately designed and manufactured. That is, there is a problem in that the operation panel (case) and the switch operation knob 54 can not be used for the distribution illumination type in which the light-emitting unit is provided on the extending line of the barrier wall.

SUMMARY OF THE INVENTION

The present invention has been finalized in view of the drawbacks inherent in an illumination push switch unit according to the related art, and it is an object of the present invention to provide an illumination push switch unit capable of using a case and an operation member in a distribution illumination type in which a light-emitting unit is provided on an extending line of a barrier wall.

According to a first aspect of the invention, an illumination push switch unit includes: a case having first and second supporting holes that are adjacent to each other with a barrier wall interposed therebetween; first and second operation members that have display surfaces and peripheral walls and are held in the first and second supporting holes so as to perform pressing operation; an insulating substrate that is located at lower sides of the first and second operation members and is fixed to the case; first and second light-emitting bodies that are disposed on the insulating substrate and project light toward each display surface of the first and second operation members; and first and second detecting units that are disposed on the insulating substrate and are driven by driving units provided at the peripheral walls of the first and second operation members in accordance with the pressing operation of the first and second operation members. Further, the driving units for driving the first and second detecting units are formed at side walls other than adjacent side walls of the peripheral walls with the barrier walls interposed therebetween, notch portions are provided at the bottom surface side of the barrier wall and the bottom surface sides of the adjacent side walls of the peripheral walls with the barrier wall interposed therebetween, and a space portion, which becomes an optical path toward the display surfaces of the first and second operation members, is formed between the top surface of the insulating substrate and the notch portions through the notch portions.

Preferably, the first and second detecting units are disposed on portions of the insulating substrate which are located near both inner walls opposite to adjacent inner walls of the first and second supporting holes with the barrier wall interposed therebetween, and the driving units provided in the first and second operation members are formed at both the side walls opposite to the adjacent side walls of the peripheral walls with the barrier wall interposed therebetween.

DESCRIPTION OF THE PREFERRED EMBODIMENT

Figure 1:
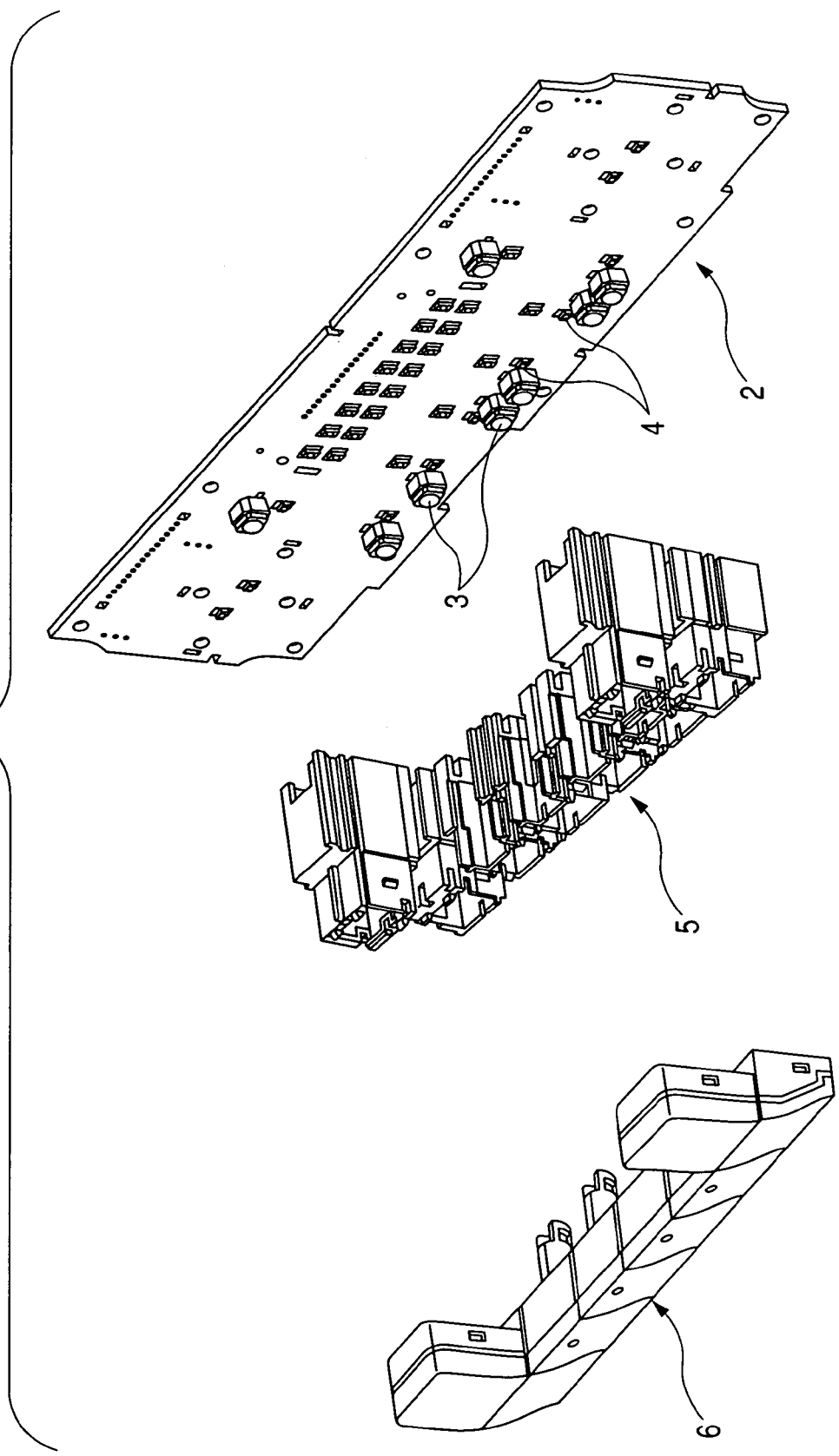
FIG. 1 is a perspective view illustrating an illumination push switch unit according to an embodiment of the invention.
Figure 2:
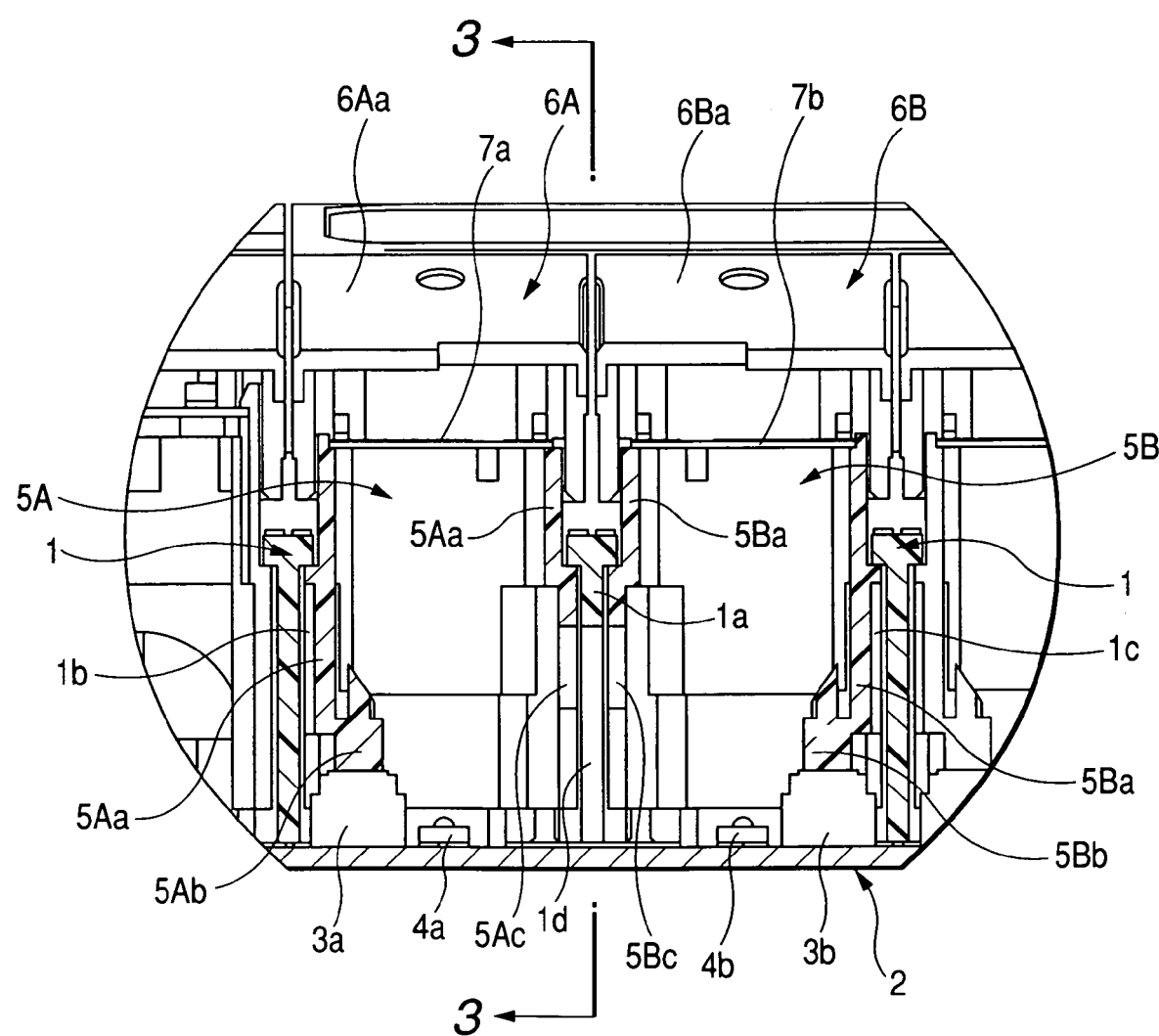
FIG. 2 is a cross-sectional view illustrating essential elements of the illumination push switch unit according to the embodiment of the invention.
Figure 3:
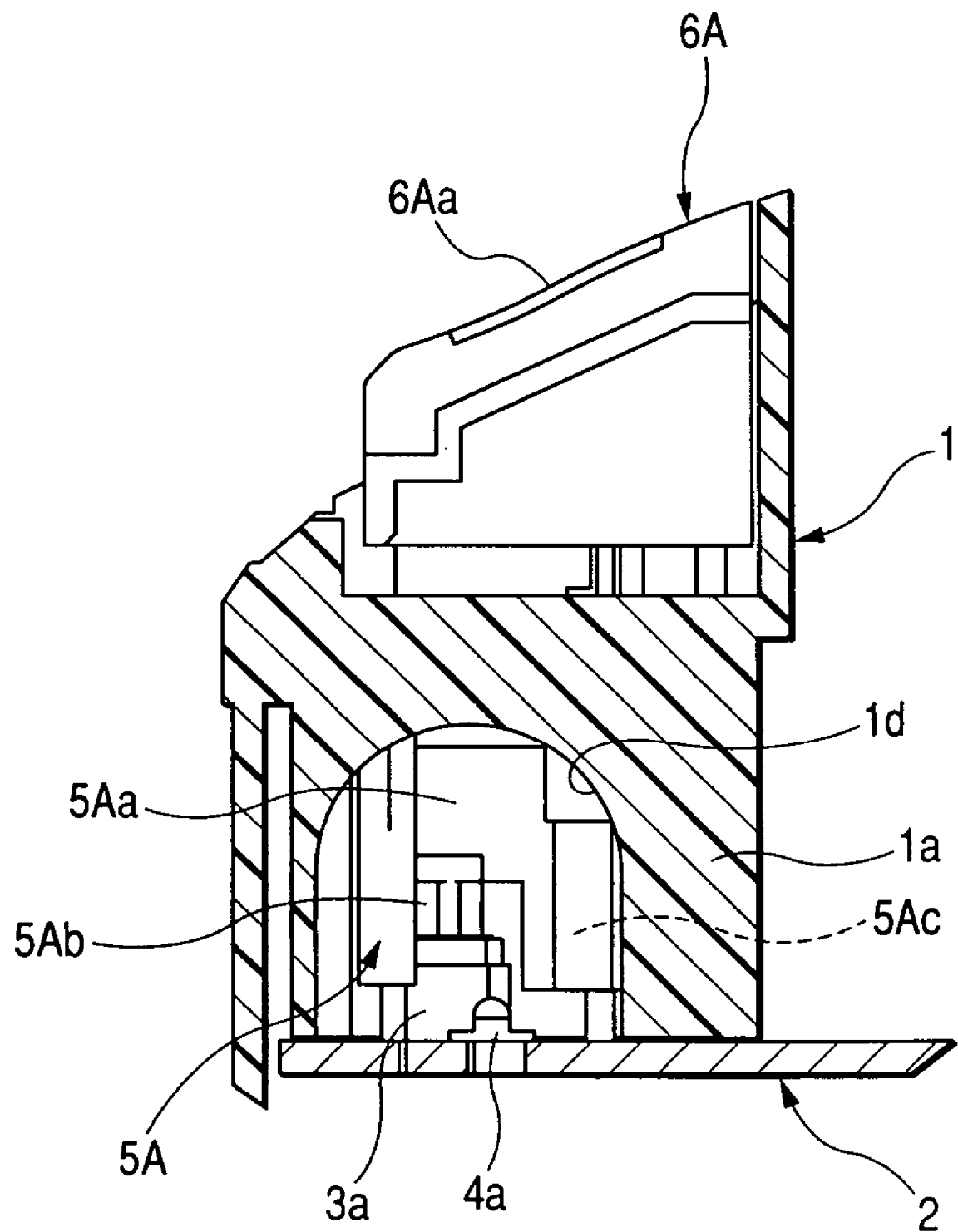
FIG. 3 is a cross-sectional view taken along the line III-III of FIG. 2.
Figure 4:
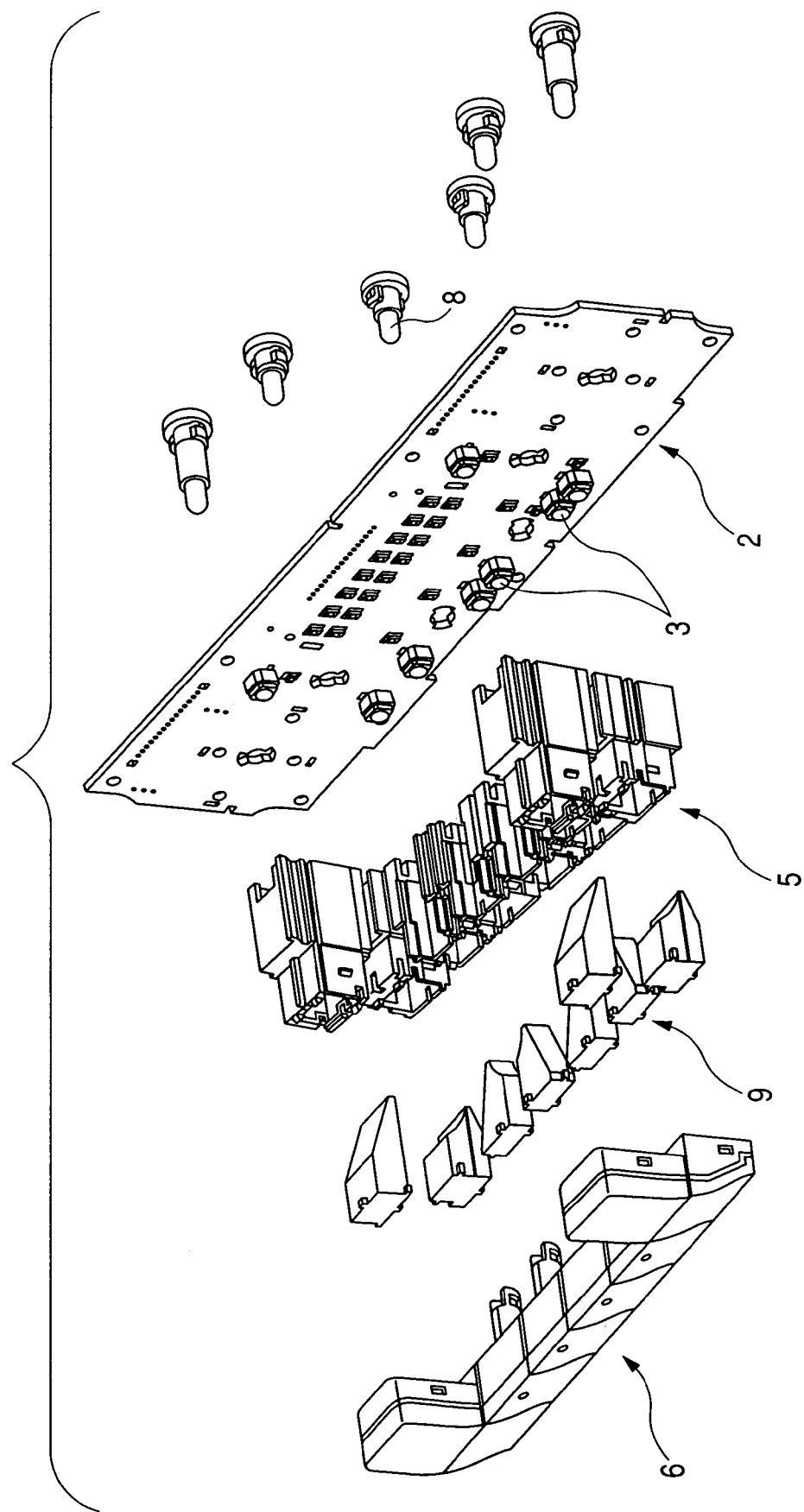
FIG. 4 is a perspective view illustrating a structure in which the illumination push switch unit of the invention is applied to a distribution illumination type.
Figure 5:
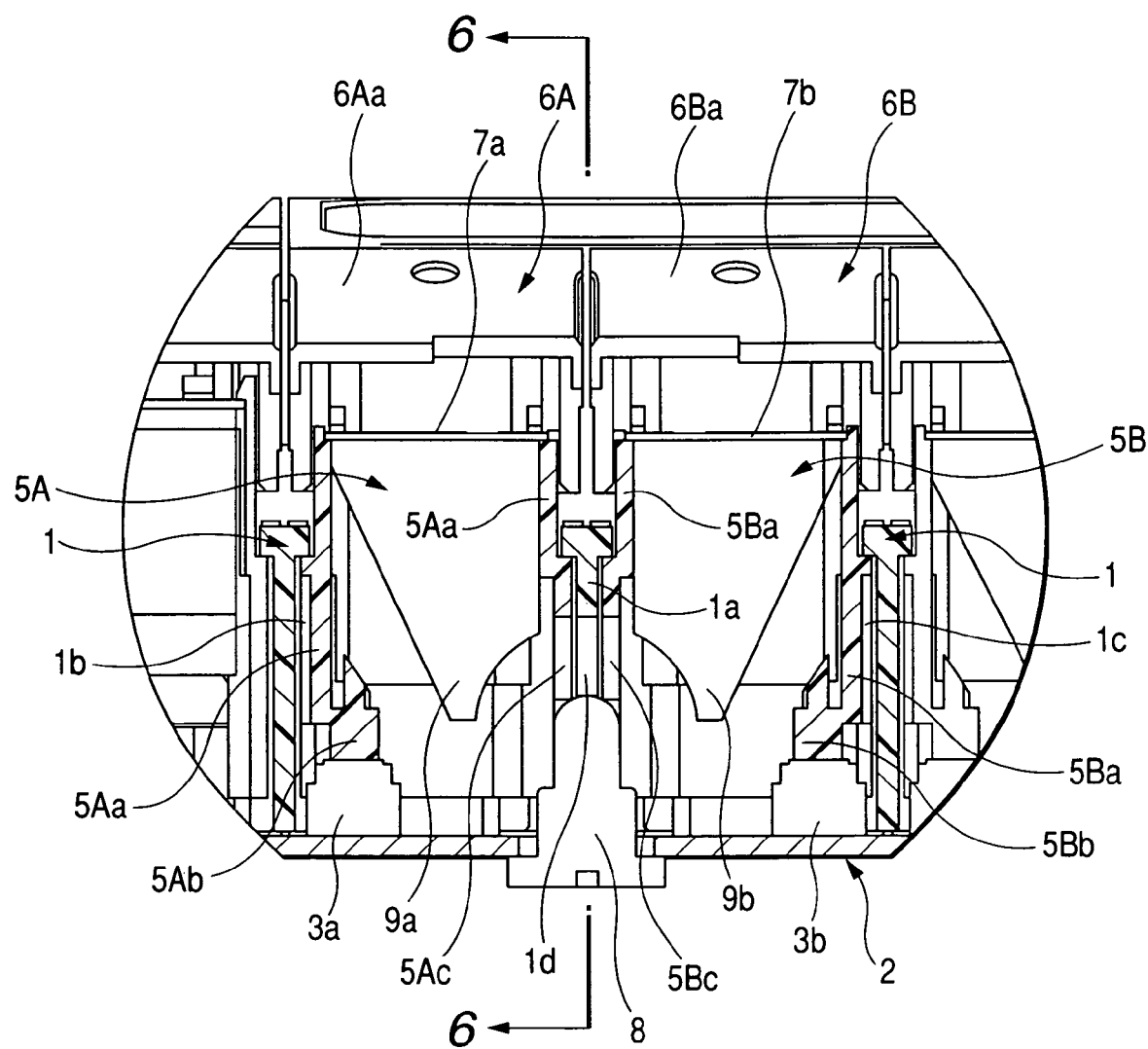
FIG. 5 is a cross-sectional view of essential elements shown in FIG. 4.
Figure 6:
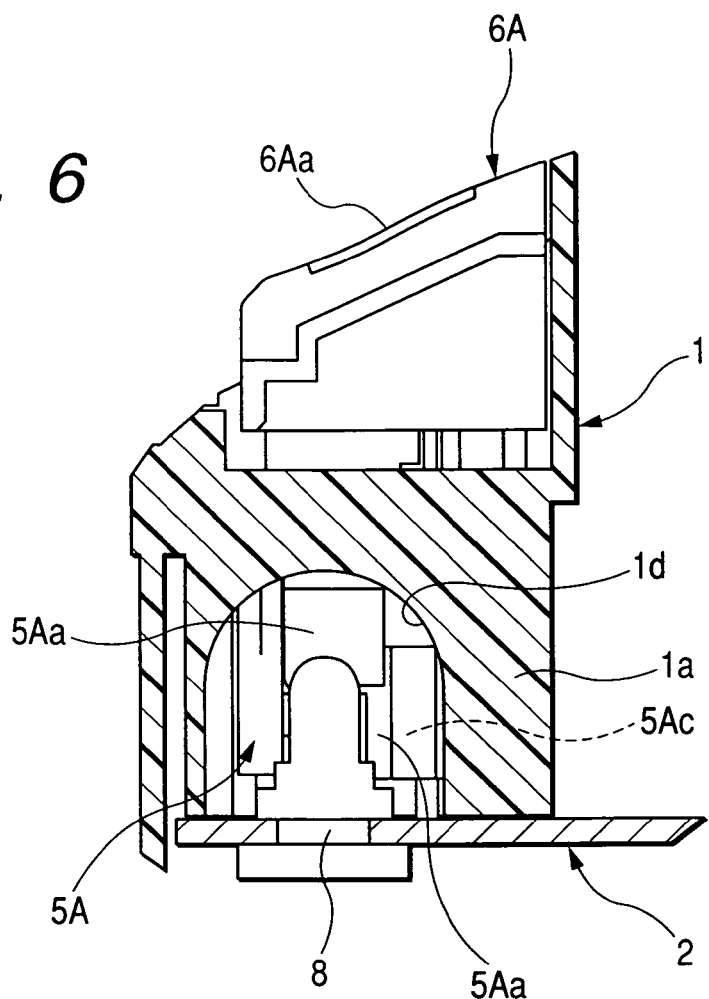
FIG. 6 is a cross-sectional view taken along the line VI-VI of FIG. 5.
Figure 7:
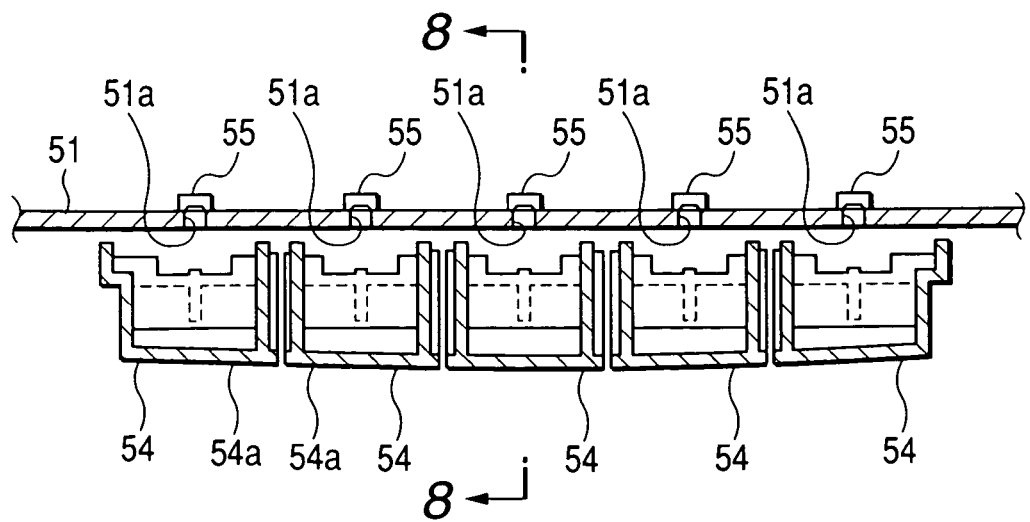
FIG. 7 is a cross-sectional view of essential elements of an illumination push switch unit according to a related art.
Figure 8:
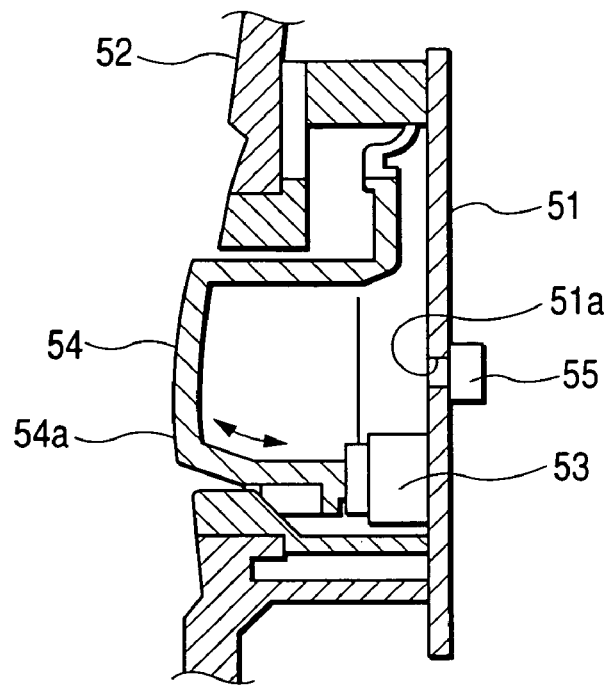
FIG. 8 is a cross-sectional view taken along the line VIII-VIII of FIG. 7.
Figure 9:
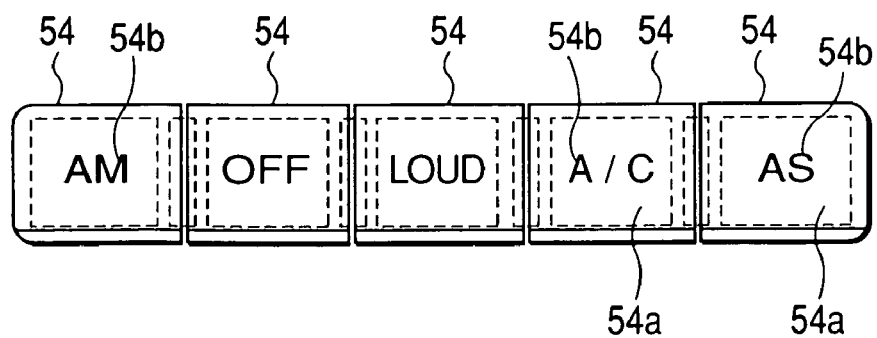
FIG. 9 is a diagram illustrating each switch operation knob according to the related art.

Hereinafter, an embodiment of the invention is shown in FIGS. 1 to 6. FIG. 1 is a perspective view illustrating an illumination push switch unit according to an embodiment of the invention; FIG. 2 is a cross-sectional view illustrating essential elements of the illumination push switch unit according to the embodiment of the invention; FIG. 3 is a cross-sectional view taken along the line III-III of FIG. 2; FIG. 4 is a perspective view illustrating a structure in which the illumination push switch unit of the invention is applied to a distribution illumination type; FIG. 5 is a cross-sectional view of essential elements shown in FIG. 4; and FIG. 6 is a cross-sectional view taken along the line VI-VI of FIG. 5.

In FIGS. 1 to 3, an illumination push switch unit of the invention mainly includes a case 1 composed of a housing made of a synthetic resin or the like, an insulating substrate 2 which is fixed to the case 1 and in which a plurality of detecting units 3 and a plurality of light-emitting bodies 4 are disposed, a plurality of sliders 5 which are held in the case 1 so as to perform pressing operation and drive the plurality of detecting units 3, and a plurality of knobs 6 which are mounted on the plurality of sliders 5 and are illuminated with light projected from the plurality of light-emitting bodies 4.

As shown in FIG. 2, the case 1 has a plurality of first supporting holes 1b and a plurality of second supporting holes 1c, which are adjacent to one another with a barrier wall 1a interposed therebetween. The first supporting hole 1b and the second supporting hole 1c have a substantially rectangular shape. In the first supporting hole 1b and the second supporting hole 1c, a first slider 5A and a second slider 5B, which are formed of an insulating material such as a synthetic resin and have a substantially rectangular shape, are accommodated so as to perform pressing operation.

In addition, the first slider 5A and the second slider 5B have a hollow shape such that their tops and their bottoms are opened, and have peripheral walls 5Aa and 5Ba formed at sides, respectively. The hollow portions transmit the light projected from the light-emitting bodies 4. In addition, a first knob 6A and a second knob 6B, which are formed of insulating materials such as synthetic resins, are mounted on the opened top surfaces of the peripheral walls 5Aa and 5Ba, and the top surfaces of the first and second knobs 6A and 6B become display surfaces 6Aa and 6Ba for illumination.

Further, colored plates 7a and 7b lie between the top surfaces of the peripheral walls 5Aa and 5Ba and the first and second knobs, and the display surfaces 6Aa and 6Ba are illuminated through the colored plates 7a and 7b. Furthermore, the slider 5 and the knob 6 are engaged with each other and are accommodated in the case 1 so as to integrally perform pressing operation. The first slider 5A and the first knob 6A constitute a first operation member and the second slider 5B and the second knob 6B constitute a second operation member.

Furthermore, the insulating substrate 2 is fixed to the lower sides of the first supporting hole 1b and the second supporting hole 1c of the case 1. The insulating substrate 2 is composed of a laminated plate made of a phenol resin. On the top surface side of the insulating substrate 2, at the centers of both lower ends of the first supporting hole 1b and the second supporting hole 1c, a first light-emitting body 4a and a second light-emitting body 4b each composed of an LED or the like are disposed. On portions of the insulating substrate 2 which are located near both inner walls opposite to adjacent inner walls of the first supporting hole 1b and the second supporting hole 1c with the barrier wall 1a interposed therebetween, a first detecting unit 3a and a second detecting unit 3b each composed of a duct switch are disposed.

In addition, in the first slider 5A and the second slider 5B, at both side walls opposite to adjacent side walls of the four peripheral walls 5Aa and 5Ba with the barrier wall 1a interposed therebetween, convex driving units 5Ab and 5Bb protruding in the hollow portions are formed. The driving units 5Ab and 5Bb come into contact with the first and second detecting units 3a and the 3b such they can press on the first and second detection units to drive them.

In this case, the driving units 5Ab and 5Bb for pressing and driving the first and second detecting units 3a and 3b are formed at the side walls other than the adjacent side walls of the peripheral walls 5Aa and 5Ba with the barrier wall 1a interposed therebetween (in the present embodiment, side walls opposite to each other with the hollow portions interposed therebetween). In addition, at the bottom surface side of the barrier wall 1a and the bottom surface sides of the adjacent side walls of the four peripheral walls 5Aa and 5Ba with the barrier wall 1a interposed therebetween, reversed U-shaped notch portions id, 5Ac and 5Bc each having a slightly large size are formed.

The notch portions 1d, 5Ac, and 5Bc are formed at the bottom surface sides of the barrier wall 1a and the peripheral walls 5Aa and 5Ba, so that the hollow portions of the first and second sliders 5A and 5B are connected to each other. Through the notch portions 1d, 5Ac and 5Bc, a space portion, which becomes an optical path toward the display surfaces 6Aa and 6Ba of the first knob 6A mounted on the top surface of the first slider 5A and the second knob 6B mounted on the top surface of the second slider 5B, is formed between the top surface of the insulating substrate 2, and the notch portions 1d, 5Ac and 5Bc.

As such, the first and second detecting units 3a and 3b are disposed on the portions of the insulating substrate 2 which are located near both the inner walls opposite to the adjacent inner walls of the first supporting hole 1b and the second supporting hole 1c with the barrier wall 1a interposed therebetween, and the driving units 5Ab and 5Bb provided in the first and second sliders 5A and 5B are formed at both the side walls opposite to the adjacent side walls of the peripheral walls 5Aa and 5Ba with the barrier wall 1*a* interposed therebetween. Therefore, with a simple structure, at the bottom surface side of the barrier wall 1*a* and the bottom surface sides of the adjacent side walls of the peripheral walls 5Aa and 5Ba with the barrier wall 1*a* interposed therebetween, the space portion, which becomes an optical path toward the display surfaces 6Aa and 6Ba of the first knob 6A and the second knob 6B, can be formed.

The operation of the illumination push switch unit having the above-mentioned structure is as follows. The knob 6 serving as the operation member is pressed, the slider 5 is pressed, the driving units 5Ab and 5Bb press on the detecting units 3 each composed of the duct switch, a corresponding circuit is turned on, and a desired output is obtained. At this time, the light-emitting body 4 composed of the LED emits light and the light from the light-emitting body 4 illuminates the display surfaces 6Aa and 6Ba of the knob 6 after passing through the hollow portion of the slider 5 and the colored plate 7.

In the present embodiment, each of the light-emitting bodies 4 is provided with respect to one knob 6 and has a structure of an individual illumination type.

FIGS. 4 and 6 show a structure in which the above-mentioned illumination push switch unit is applied to the distribution illumination type.

In this case, as shown in FIG. 5, the light-emitting body 8 is composed of not the LED but a lamp. In addition, on the insulating substrate 2, the light-emitting body 8 is disposed so as to be located in the notch portions 1*d*, 5Ac and 5Bc formed at the bottom surface sides of the barrier plate 1*a* of the case 1 and the peripheral portions 5Aa and 5Ba of the slider 5.

That is, in the present structure, one light-emitting body 8 illuminates the display surfaces 6Aa and 6Ba of the first and second knobs 6A and 6B mounted on the first and second sliders 5A and 5B which are adjacent to each other with the barrier plate 1*a* of the case 1 interposed therebetween and are accommodated in the first and second supporting holes 1*b* and 1*c*.

In the present structure, as shown in FIG. 5, light guiding bodies 9*a* and 9*b* composed of light transmitting resins are provided in the hollow portions of the first and second sliders 5A and 5B such that light projected from the light-emitting body 8 is efficiently guided to the display surfaces 6Aa and 6Ba of the first and second knobs 6A and 6B. By providing the light guiding bodies 9*a* and 9*b*, it is possible to surely illuminate the display surfaces 6Aa and 6Ba of the two knobs 6 using only one light-emitting body 8.

According to the above-mentioned embodiment of the invention, the driving units 5Ab and 5Bb of the first and second sliders 5A and 5B for driving the first and second detecting units 3*a* and 3*b* each composed of the duct switch are formed at the side walls other than the adjacent side walls of the peripheral walls 5Aa and 5Ba with the barrier wall 1*a* interposed therebetween. In addition, at the bottom surface side of the barrier wall 1*a* and the bottom surface sides of the adjacent side walls of the peripheral walls with the barrier wall 1*a* interposed therebetween, the notch portions 1*d*, 5Ac and 5Bc are formed. Through the notch portions 1*d*, 5Ac and 5Bc, a space portion, which becomes an optical path toward the display surfaces 6Aa and 6Ba of the first knob 6A and the second knob 6B, is formed between the top surface of the insulating substrate 2, and the notch portions 1*d*, 5Ac and 5Bc. For this reason, the barrier wall 1*a* of the case 1, the adjacent side walls of the first and second sliders 5A and 5B, and the driving units 5Ab and 5Bb provided at the side walls of the peripheral walls do not disturb the optical path from a point of an extending line of the barrier wall 1*a* existing on the insulating substrate 2 toward the display surfaces 6Aa and 6Ba of the first and second knobs 6A and 6B. Therefore, using the case 1 and the first and second sliders 5A and 5B described above, the illumination push switch unit of the invention can be used in the structure of the distribution illumination type where the light-emitting body 8 is provided on the extending line of the barrier wall 1*a*.

As described above, an illumination push switch unit of the invention includes a case having first and second supporting holes that are adjacent to each other with a barrier wall interposed therebetween; first and second operation members that have display surfaces and peripheral walls and are held in the first and second supporting holes so as to perform pressing operation; an insulating substrate that is located at lower sides of the first and second operation members and is fixed to the case; first and second light-emitting bodies that are disposed on the insulating substrate and project light toward each display surface of the first and second operation members; and first and second detecting units that are disposed on the insulating substrate and are driven by driving units provided at the peripheral walls of the first and second operation members in accordance with pressing operation of the first and second operation members. Further, the driving units for driving the first and second detecting units are formed at side walls other than adjacent side walls of the peripheral walls with the barrier walls interposed therebetween, notch portions are provided at the bottom surface side of the barrier wall and the bottom surface sides of the adjacent side walls of the peripheral walls with the barrier wall interposed therebetween, and a space portion, which becomes an optical path toward the display surfaces of the first and second operation members, is formed between the top surface of the insulating substrate and the notch portions through the notch portions. Therefore, the barrier wall of the case, the adjacent side walls of the first and second operation members, and the driving units provided at the side walls of the peripheral walls do not disturb the optical path from a point of an extending line of the barrier wall existing on the insulating substrate toward the display surfaces of the first and second operation members. As a result, using the same case and first and second operation members described above, the illumination push switch unit of the invention can be used in the structure of the distribution illumination type where the light-emitting body is provided on the extending line of the barrier wall.

Preferably, the first and second detecting units are disposed on portions of the insulating substrate which is located near both inner walls opposite to adjacent inner walls of the first and second supporting holes with the barrier wall interposed therebetween, and the driving units provided in the first and second operation members are formed at both the side walls opposite to the adjacent side walls of the peripheral walls with the barrier wall interposed therebetween. Therefore, it is possible to form the space portion becoming the optical path toward the display surfaces of the first and second operation members at the lower surface side of the barrier wall and the lower surface sides of the adjacent side walls with the barrier wall interposed therebetween, with a simple structure.

The invention claimed is:

1. An illumination push switch unit comprising:
  a case having first and second supporting holes that are adjacent to each other with a barrier wall interposed therebetween;

first and second operation members that have display surfaces and peripheral walls and are held in the first and second supporting holes so as to perform pressing operation;

an insulating substrate that is located at lower sides of the first and second operation members and is fixed to the case;

first and second light-emitting bodies that are disposed on the insulating substrate and project light toward each display surface of the first and second operation members; and first and second detecting units that are disposed on the insulating substrate and are driven by driving units provided at the peripheral walls of the first and second operation members in accordance with the pressing operation of the first and second operation members, wherein the driving units for driving the first and second detecting units are formed at side walls other than adjacent side walls of the peripheral walls with the barrier walls interposed therebetween, notch portions are provided at the bottom surface side of the barrier wall and the bottom surface sides of the adjacent side walls of the peripheral walls with the barrier wall interposed therebetween, and a space portion, which becomes an optical path toward the display surfaces of the first and second operation members, is formed between the top surface of the insulating substrate and the notch portions through the notch portions.

2. The illumination push switch unit according to claim 1, wherein the first and second detecting units are disposed on portions of the insulating substrate which are located near both inner walls opposite to adjacent inner walls of the first and second supporting holes with the barrier wall interposed therebetween, and the driving units provided in the first and second operation members are formed at both the side walls opposite to the adjacent side walls of the peripheral walls with the barrier wall interposed therebetween.

* * * * *